No. 633,936. Patented Sept. 26, 1899.
W. W. WILSON.
SAW SET.
(Application filed Oct. 11, 1898.)
(No Model.)

Witnesses
W. C. Lunsford.
Chas. E. Brock

Inventor
William W. Wilson,
by
O'Meara & Co.
Attorneys

UNITED STATES PATENT OFFICE.

WILLIAM W. WILSON, OF MARION, KENTUCKY.

SAW-SET.

SPECIFICATION forming part of Letters Patent No. 633,936, dated September 26, 1899.

Application filed October 11, 1898. Serial No. 693,226. (No model.)

*To all whom it may concern:*

Be it known that I, WILLIAM W. WILSON, a citizen of the United States, residing at Marion, in the county of Crittenden and State of Kentucky, have invented a new and useful Saw-Set, of which the following is a specification.

This invention is a new and useful construction for saw-sets, the object being to provide an exceedingly cheap and simple device for setting the teeth of a saw at the proper angle with reference to the body thereof.

The principal object of my invention is the cheapness and simplicity of construction as well as the operation, and this I accomplish by constructing a saw-set in a single piece and comprising a suitable body portion having a notch therein adapted to receive the tooth to be set, a handle connected to the said body and by means of which the device is operated, and a stop-arm for limiting the movement of the device.

The invention consists also in certain details of construction and novelties of combination, all of which will be fully described hereinafter and pointed out in the claims.

Figure 1:
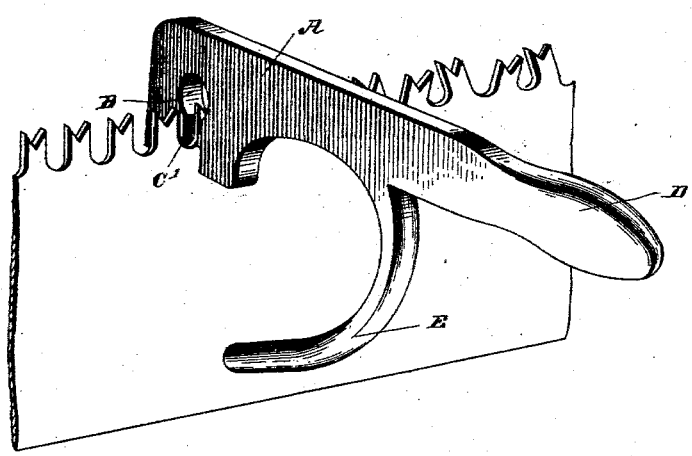
Figure 2:
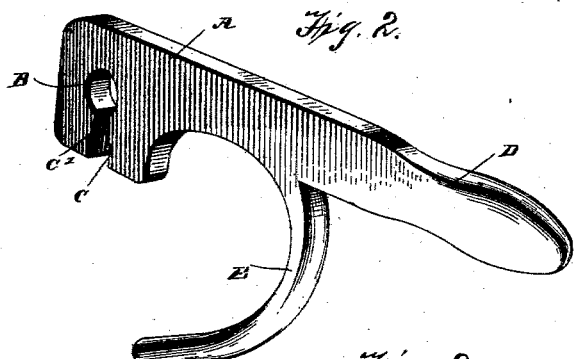
Figure 3:
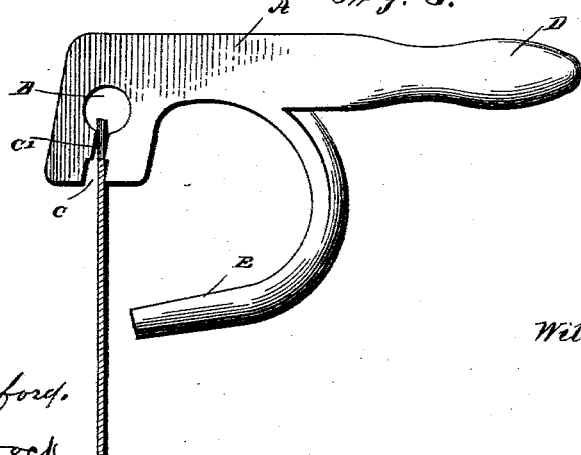

In the drawings forming a part of this specification, Figure 1 is a perspective view showing the manner of operating my invention. Fig. 2 is a detail perspective view of a saw-set. Fig. 3 is a side view of a saw-set, the saw being shown in section.

In carrying out my invention I construct the entire device from a single piece and in so doing construct the body A with an opening B, and leading into the said opening B is a slot C, which is somewhat reduced, as shown at C', thereby providing a slot of two widths, whereby teeth of different thickness and of different length can be bent at different angles, according to whether the tooth is projected into the narrow or broad portion of the slot.

Extending from the body A is the handle D, and depending from the body at its junction with the handle is the stop-arm E, which is curved downwardly and then forwardly, as most clearly shown in Fig. 3, the end thereof being adapted to engage the blade of the saw and limit the movement of the setter, thereby regulating the angle the tooth of the saw can be set.

The operation of my device will of course be clear to every one skilled in the art to which it pertains, and the advantage of the variable slot in the body or head and the position or arrangement of the stop-arm will of course be readily appreciated.

Having thus fully described my invention, what I claim as new, and desire to secure by Letters Patent of the United States, is—

1. In a saw-set, a body portion having a circular opening in the head thereof and a slot of varying diameters leading into the said opening, a handle integral with the body portion, and a forwardly and downwardly curved stop-arm connected with the said body portion and integral therewith at its junction with the handle, substantially as shown and described.

2. In a saw-set a body portion, a handle and a head cast in one piece, a circular opening in the head and a slot of varying diameters leading into said opening and a downwardly and forwardly extending curved stop-arm integrally connected to the body portion at its junction with the handle substantially as described.

WILLIAM W. WILSON.

Witnesses:
 PERRY D. MAXWELL,
 JOSEPH T. WILSON.